United States Patent
Gibbons et al.

(10) Patent No.: US 6,933,925 B1
(45) Date of Patent: Aug. 23, 2005

(54) COMPUTER MOUSE WITH ELASTOMERIC DOME SWITCH

(75) Inventors: R. Thomas Gibbons, Mercer Island, WA (US); Kennard E. Nielsen, Redmond, WA (US); Matthew G. Pedersen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 298 days.

(21) Appl. No.: 10/184,109

(22) Filed: Jun. 28, 2002

(51) Int. Cl.[7] .............................................. G09G 5/08
(52) U.S. Cl. ...................................................... 345/163
(58) Field of Search ............................... 345/156, 157, 345/160, 163, 168; 200/511–517, 5 A, 5 E, 200/5 R; 463/30, 31, 36, 37, 38; 348/734; 341/21, 22, 23

(56) References Cited

U.S. PATENT DOCUMENTS

| | | | |
|---|---|---|---|
| 4,508,942 A * | 4/1985 | Inaba ........................ 200/5 A |
| 5,063,376 A | 11/1991 | Chang | |
| 5,231,386 A * | 7/1993 | Brandenburg et al. ...... 345/168 |
| 5,570,114 A * | 10/1996 | Fowler ........................ 345/173 |
| 5,630,501 A * | 5/1997 | Tsay ............................ 200/344 |
| 5,828,364 A | 10/1998 | Siddiqui | |
| 5,879,088 A * | 3/1999 | English ...................... 200/5 A |
| 5,914,468 A * | 6/1999 | Nishimura et al. ......... 200/5 A |
| 6,135,886 A * | 10/2000 | Armstrong ................... 463/37 |
| 6,224,279 B1 | 5/2001 | Nielsen et al. | |
| 6,256,013 B1 | 7/2001 | Siddiqui | |
| 6,313,826 B1 * | 11/2001 | Schrum et al. ............. 345/161 |
| 6,429,851 B1 * | 8/2002 | Vaghefi et al. ............. 345/163 |
| 6,491,456 B2 * | 12/2002 | Shih et al. .................. 200/5 A |
| 6,690,360 B2 * | 2/2004 | Johnston et al. ............ 345/168 |

* cited by examiner

*Primary Examiner*—Chanh Nguyen
(74) *Attorney, Agent, or Firm*—Banner & Witcoff, LTD (57) ABSTRACT

A mouse or other hand-held computer pointing and/or input device is equipped with one or more elastomeric dome switches. Downward force upon the elastomeric dome switch causes a hollow portion to collapse and bring an electrically conductive surface into contact with open conductive leads, thereby closing an electrical connection. In alternate embodiments, a membrane switch and/or a noise producing device can be added.

24 Claims, 9 Drawing Sheets

COMPUTER MOUSE WITH ELASTOMERIC DOME SWITCH

FIELD OF THE INVENTION

This invention relates to computer pointing devices and switches used in such devices, and more particularly, to switches used with "mouse" type pointing devices.

BACKGROUND OF THE INVENTION

Figure 1:
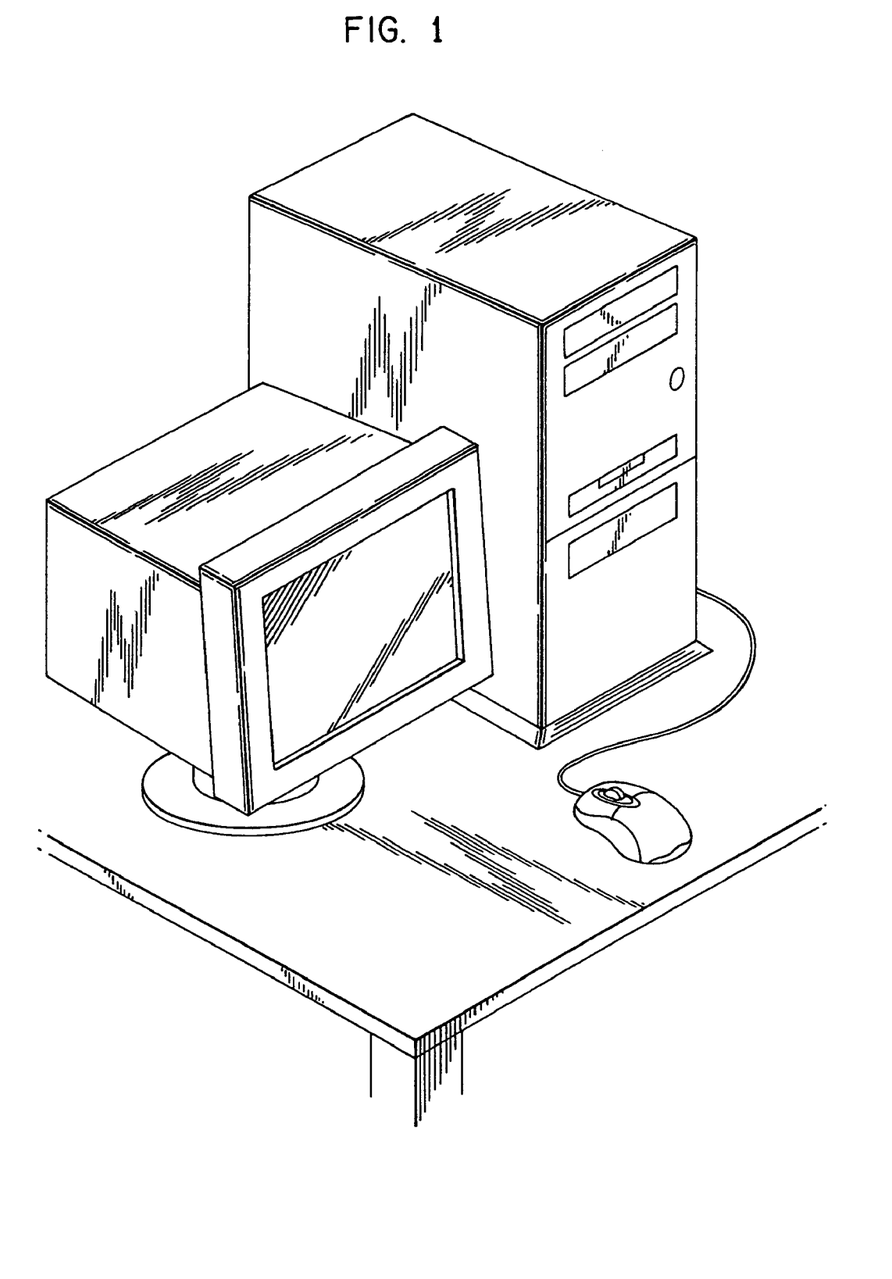
FIG. 1 is an outer view of a computer mouse.

In many computers, data is often input through use of a pointing device that moves a cursor on a computer screen. By pressing one or more buttons on the pointing device, the user can then select a menu item, highlight a portion of the display, select a screen region for inquiry or other action, select hypertext (in, e.g., a Web browser), or perform numerous other activities well-known to computer users. One such pointing device, and perhaps the most ubiquitous, is commonly referred to as a "mouse." Typically, a mouse is molded to comfortably fit a user's hand; contains internal sensors for detecting, measuring and encoding movement of the mouse across a desktop, mouse pad or other surface; and is connected to a computer by a cord or a wireless connection. A mouse typically has two or more buttons that a user can press to make a selection. FIG. 1 shows a typical mouse.

Although most mice operate according to the same overall scheme (i.e., movement across a surface is translated into cursor movement), internal components and designs vary widely. For example, many mice detect and measure movement through use of a ball that rolls as the mouse is moved across a mouse pad or other surface, with the ball in turn moving encoder wheels. Other designs use a Light Emitting Diode or other source and an accompanying detector to measure movement by reflection from surface irregularities of a desktop or other surface. Some mice receive power and communicate with a computer through a cord, while "wireless" mice may be battery powered and communicate by infrared (IR) or radio frequency (RF) radiation. Although most mice have at least primary and secondary buttons for user input (the familiar "right-click" and "left-click" buttons), other mice have additional buttons (used for, e.g., forward and backward browser selection, etc.), scroll wheels, etc.

Figure 2:
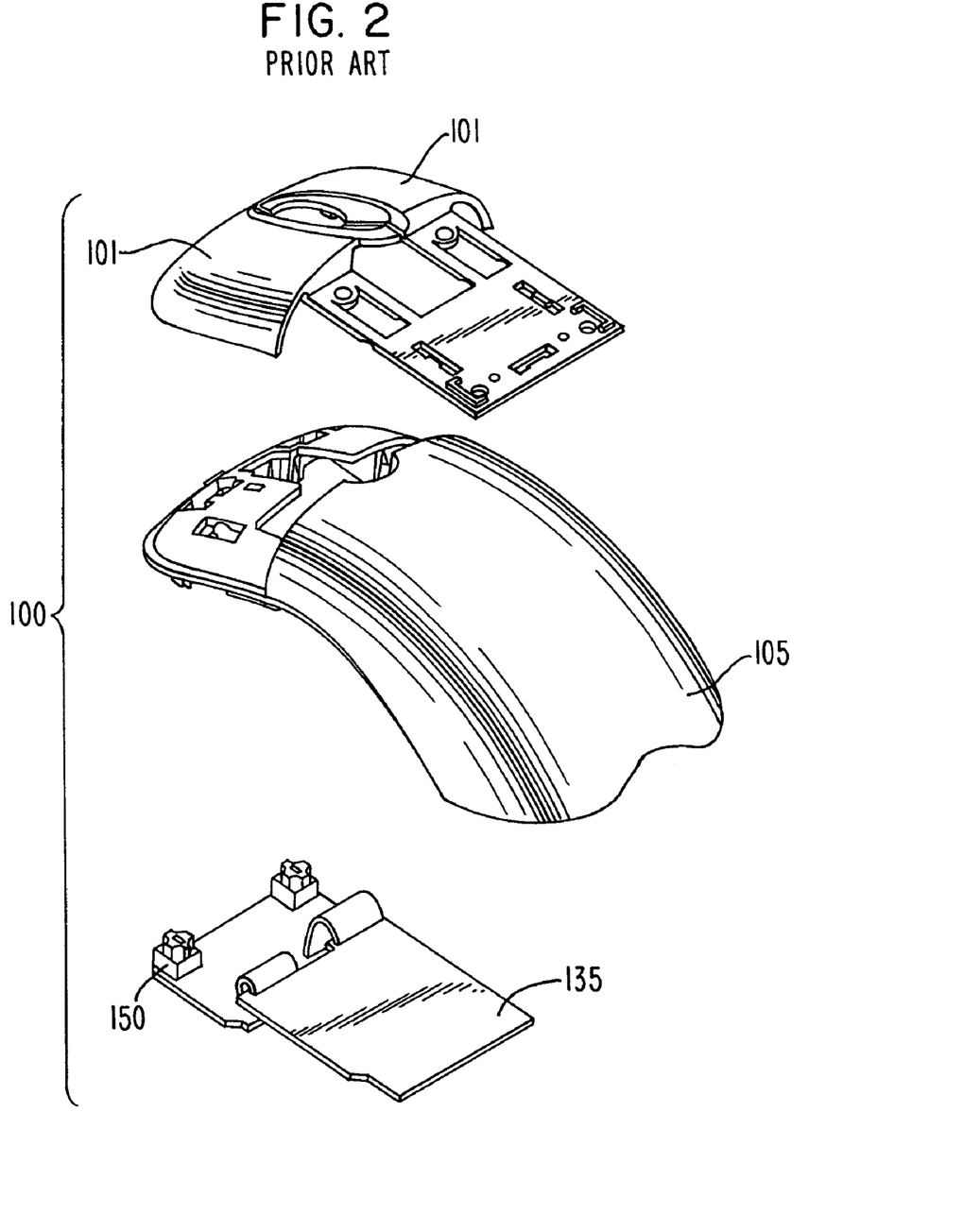
FIG. 2 is an "exploded" view of a computer mouse having a conventional metallic disc switch, with various components omitted for clarity.
Figure 3:
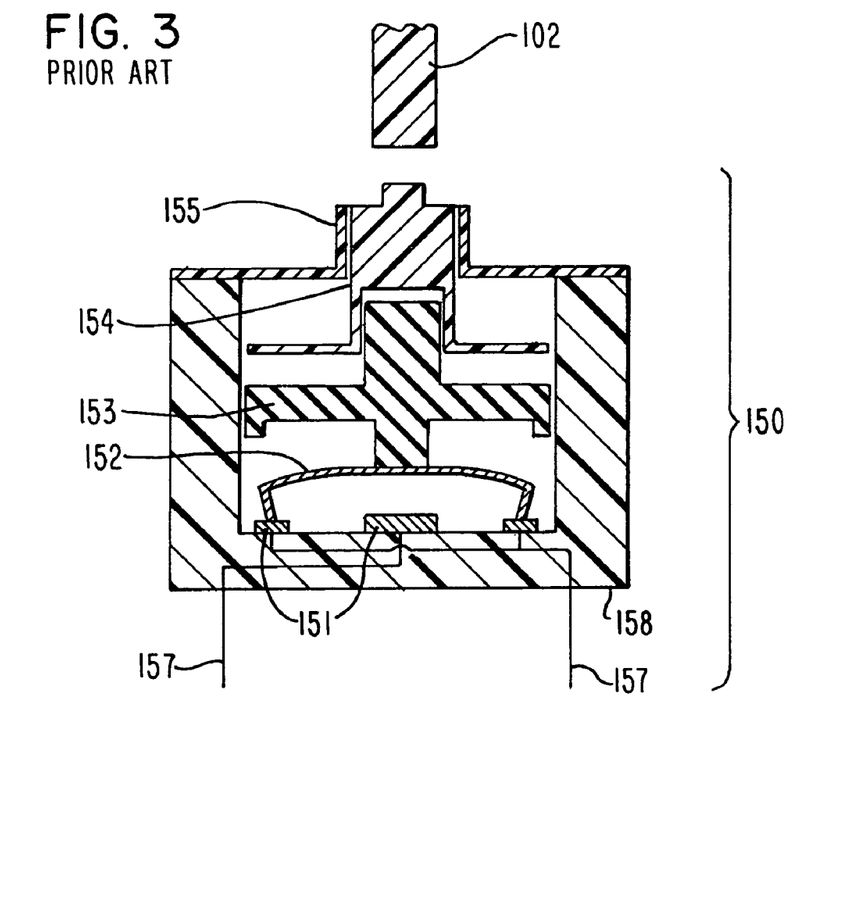
FIG. 3 is a partially schematic cross section of a conventional metallic disc switch.

Despite the wide variety of mouse designs and options, most computer mice use switches having an internal mechanism that relies upon deforming a metallic component. These switches typically have an internal metal beam or disc that is encased in a plastic housing, and which is then soldered or otherwise attached to a printed circuit board within the mouse. When the user presses a mouse button, a plunger or post on the bottom of that button pushes down upon the metal disc or strip, acting against the spring-loaded bias of the metal to move the beam (or disc) into a position to close a circuit. FIG. 2 shows one such arrangement in an exploded view of a conventional mouse 100, with the lower case and other components omitted for the purpose of clarity. As the user depresses one of the buttons 101 movably attached to the mouse upper case 105, a post attached to the underside of button 101 moves downward. In an assembled state, the end of that post is over, and acts upon switch 150. Switch 150 is attached to printed circuit board 135, which is in turn attached to upper housing 100 and/or a lower mouse housing (not shown). FIG. 3 shows additional details of a prior art switch in operation in this example of a metallic disc switch. FIG. 3 is a partially schematic cross-section of switch 150. Located in the bottom of lower housing 158 are electrical contacts 151 with associated leads 157. Resting above contacts 151 is a metallic disc 152. As shown, the disc is normally bowed upward, and the contacts 151 are not closed. When post 102 moves downward, it pushes upon a plastic cap 154 (held by upper housing 155), which in turn presses down upon a rubber plunger 153, which in turn collapses disc 152 to close contacts 151. Upon release of the downward force of 102, the disc 151 returns to the upwardly bowed state.

Figure 3A:
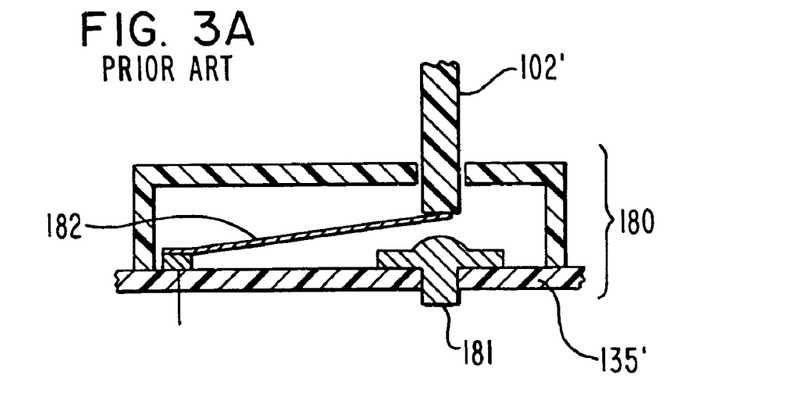
FIG. 3A is a partially schematic cross-section of a conventional metallic beam switch.

FIG. 3A is a schematic drawing of a metallic beam switch. As post 102' moves downward (because of the user depressing a mouse button), spring beam 182 is also pushed downward and into one of conductive contact 181 mounted on circuit board 135'. When the user releases the mouse button, the resiliency of spring beam 182 biases spring beam 182 away from contact 181.

These types of prior art switches have disadvantages. For example, these switches are relatively expensive, and thus increase the cost of manufacturing a computer mouse. For this and other reasons, there remains a need for a computer mouse with a less expensive and otherwise more advantageous type of switch mechanism.

Elastomeric dome switches are another type of switch that has been used in mobile telephones, remote controls units, keyboards and other electronic devices. Typically, these switches are made from an elastomeric compound such as silicone, and have a concave, dome-like structure. The underside of the dome typically has a contact member located therein. When sufficient downward force is exerted on the dome, the upward bias of the elastomeric dome is overcome, causing the dome to collapse. The contact member on the underside of the dome is thereby brought into contact with exposed conductive leads, a membrane switch, or other open electrical elements; and the electrical connection is thereby closed. When the downward force on the dome is released, the upward bias of the dome moves the contact member out of contact with the other switch elements, thereby opening the electrical connection.

While dome switches are inexpensive and reliable, it has generally been believed that their characteristics make them unsuitable for use in devices such as computer mice. Specifically, because of their inherent properties, prior art dome switches have been used in devices with relatively slow response speeds and large travel distances. By contrast, mouse buttons are often pressed in more rapid succession (e.g., the familiar "double-click"), and the return rate of existing elastomeric switches is not well suited for use in such a context. Similarly, the travel distance and applied force to activate a computer mouse button make existing elastomeric dome switches ill-suited in this regard.

SUMMARY OF THE INVENTION

A hand-held computer pointing and/or input device such as a mouse is equipped with one or more elastomeric dome switches. Instead of relying upon an internal metallic beam or disc to both provide spring load and to make an electrical connection, an elastomeric switch is implemented. Downward force on a mouse button is transferred to the elastomeric dome switch and causes a concave, dome-like portion of the switch to collapse. A contact surface within the dome is thereby brought into contact with, and closes, an open electrical connection. When the downward force on the mouse button is released, the elastomeric material of the dome switch biases the dome to an uncollapsed condition, thereby moving the contact surface and opening the electrical connection.

Switches conventionally used in computer mice make a click or other sound when actuated and/or when released. Dome switches are essentially silent by comparison. If a noise is desired, an additional noise-producing device can be added. For example, a piezoelectric speaker can be located within the mouse and the mouse configured to emit a noise through that speaker when a user presses a mouse button.

In one embodiment, a computer mouse has a housing that is sized and configured for manual movement by a user across a surface, permitting a corresponding movement of a cursor on a computer display. The housing has at least one depressible button, movably attached to the housing, for a user to initiate transmission of a selection signal. An internal substrate, upon which multiple mouse components are electrically interconnected, is contained with the housing and has at least one open electrical connection. The embodiment further includes an elastomeric dome switch having a concave portion and a contact portion located within the concave portion. The concave portion is biased to an uncollapsed condition, coupled to the at least one depressible button, and configured to collapse when a depressing force is imposed on that button. Upon collapse, the contact portion is brought into position to close the electrical connection. Upon reduction of the depressing force, the switch returns to the uncollapsed condition and opens the electrical connection.

DETAILED DESCRIPTION OF THE INVENTION

Figure 4:
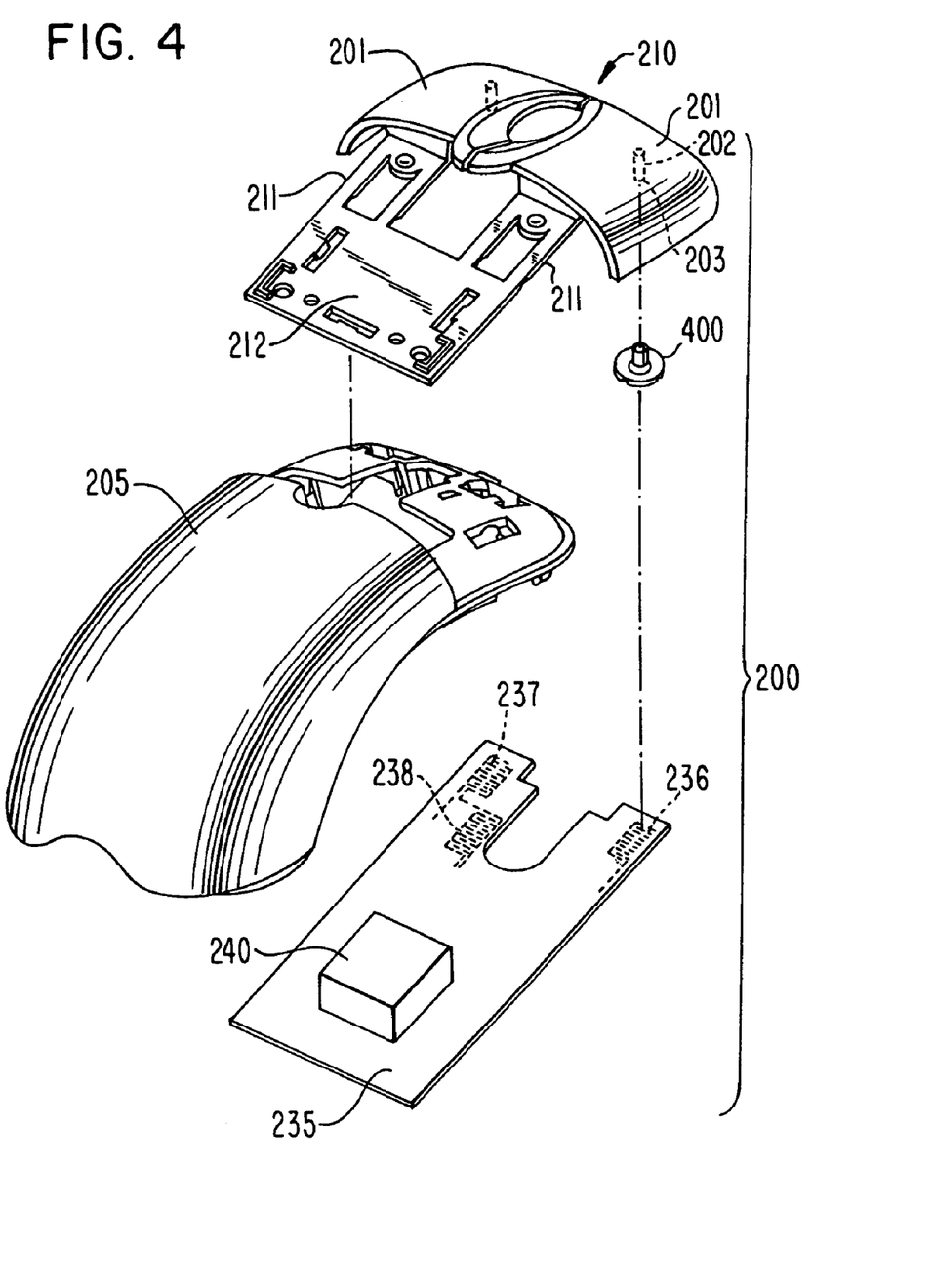
FIG. 4 is an "exploded" schematic view of a computer mouse having an elastomeric dome switch.

FIG. 4 is an exploded schematic drawing, similar in format to FIG. 2, showing a mouse 200 having an elastomeric dome switch 400 instead of a conventional metallic beam or metallic disc switch. Located on the underside of mouse button 201 is a post 202 (shown in hidden lines). Post 202 has an end 203, which fits into a depression 401 (see FIGS. 6A & 6B) in the upper portion of dome switch 400. The underside of dome switch 400 contacts circuit board 235 in contact region 236. As explained in more detail below, exposed and unconnected conductive leads can be located within region 236, or a membrane switch placed in that region. When mouse button 201 is pressed, post 202 collapses an inverted concave portion of switch 400, thereby closing an electrical connection inside contact region 236. Although not shown, button 201 on the left side of mouse 200 could also have a post 202 interacting with another dome switch 400 to close an electrical connection inside region 237. Another dome switch 400 could be placed over region 238 and activated by, e.g., a z-axis switch of a scroll wheel. Mouse 200 could also have motion sensing components 240 located on (or nested within) the circuit board 235. Components 240 could include a rolling ball, encoder wheels, and related circuitry. Components 240 might also include an infrared source and detector to sense movement by reflection from irregularities in the surface across which mouse 200 is moved. These and other devices for sensing and encoding motion of the mouse across a surface are known in the art, and further details are not necessary for understanding the present invention. Other necessary and/or optional components of mouse 200 are not shown, but are similarly known in the art.

Figure 5A:
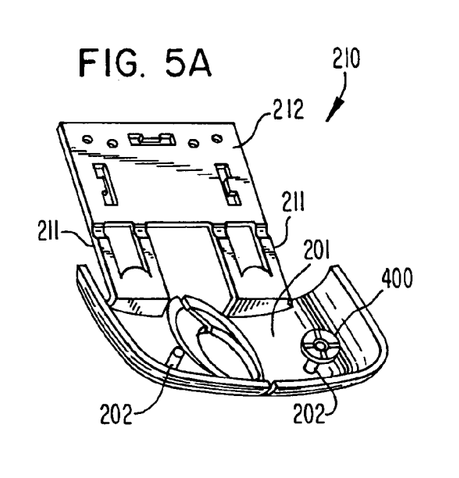
FIG. 5A is a perspective view of the underside of a set of mouse keys showing possible placement of an elastomeric dome switch.
Figure 5B:
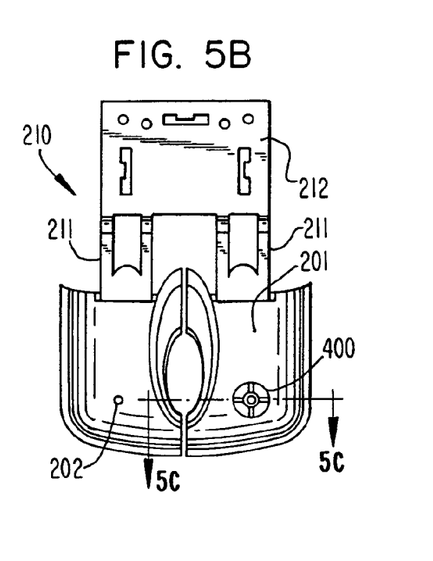
FIG. 5B is a bottom view of a set of mouse keys showing possible placement of an elastomeric dome switch.
Figure 5C:
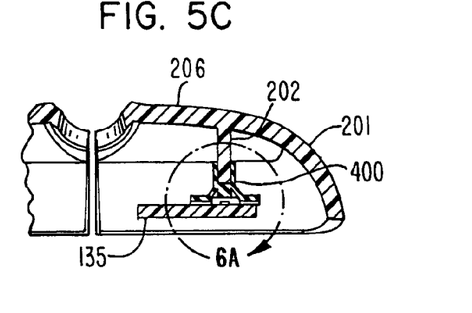
FIG. 5C is a cross section taken through line 5C—5C of FIG. 5B.

FIGS. 5A through 5C show the underside of keys 201, with one dome switch 400 in place. In one embodiment of the invention, keys 201 are formed as part of a key assembly 210. Key assembly 210 include keys 201, hinges 211 and attachment plate 212. When mouse 200 is assembled, attachment plate 212 is affixed to the underside of mouse upper case 205. In an assembled condition, the upper sides 206 of mouse buttons 201 are exposed on the outer surface of the mouse, and are the surfaces pressed by the user.

Figure 6A:
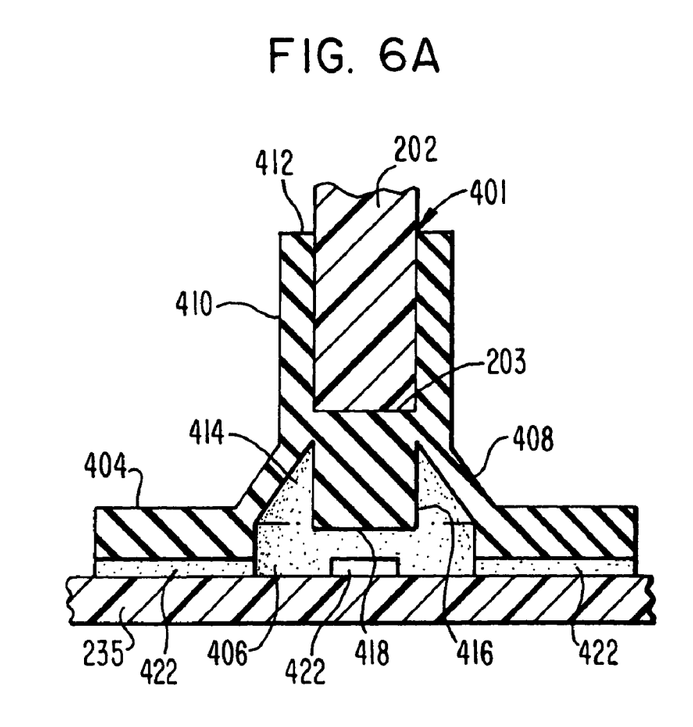
FIGS. 6A & 6B are, respectively, cross sections of an open elastomeric dome switch and of a closed elastomeric dome switch.
Figure 6B:
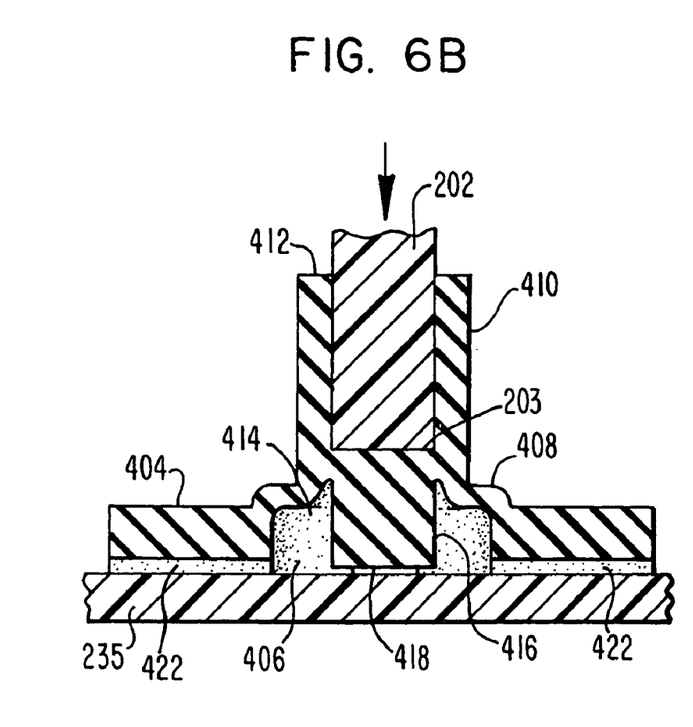

FIGS. 6A and 6B show the operation of elastomeric dome switch 400. FIG. 6A is a cross section of a dome switch 400 attached to a post 202. The lower section of dome switch 400 is located over an area of printed circuit board 235 containing exposed conductive traces which, when connected, form an electrical connection. As is known in the art, these exposed traces can be composed of copper or other conductive material, and have a region where the electrical path is interrupted. Contact by another conductive member closes the interruption and allows current to flow. Dome switch 400 has a generally flat base 404 with an aperture 406. Surrounding aperture 406 and extending above it is a generally hollow and frustoconical midsection 408. In turn, a generally cylindrical upper section 410 extends above midsection 408. A depression 401 is formed in the distal end 412 of upper section 410. The lower end 203 of post 202 fits into the depression 401. Located inside of hollow region 414 of midsection 408, and attached to the bottom of upper section 410, is a contact member 416. Contact member 416 has an underside 418; the edge of underside 418 may be rounded. Underside 418 may be electrically conductive, and may have, e.g., a conductive carbon ink coating. When an electrically conductive underside 418 contacts traces on the surface of circuit board 235, an electrical connection is closed. The base 404 of switch 400 may be mechanically attached to the surface of circuit board 235 with an adhesive, with post(s) extending from the surface of circuit board 235, or by other techniques. Alternatively, switch 400 may not be physically attached to the surface of circuit board 235, and may simply be suspended (by attachment to post 202) over the circuit elements to be closed by electrically conductive underside 418. Similarly, post 202 may be connected to upper section 410 in alternative configurations (e.g., post 202 could have a depression in its end into which a solid upper section 410 might fit). In other embodiments, a membrane switch may be used instead of exposed traces on circuit board 235. As is known in the art, membrane switches generally have two conductive films separated by a third film which is perforated. When pressure is applied to the outer surfaces of the conductive films, they are forced together across a gap formed by the perforated film, thus closing a switch. In an embodiment of the invention using a membrane switch, the underside 418 of member 416 need not be electrically conductive. Use of a membrane switch in connection with an elastomeric dome switch could provide a significant increase over prior art switches in the number of cycles that the mouse button might achieve during its lifetime.

FIG. 6B shows dome switch 400 in a closed state, i.e., closing an electrical connection. As a mouse button 201 is pressed by a user, post 202 is forced downward (as shown by the arrow). The downward force of post 202 causes the walls of midsection 408 to bend, thereby collapsing midsection 408, and forcing the underside 418 of member 416 into contact with circuit board 235. When the user releases button 201, the downward force on post 202 is released, and the inherent resiliency of the walls of midsection 408 causes the switch to return to its original shape.

Figure 7:
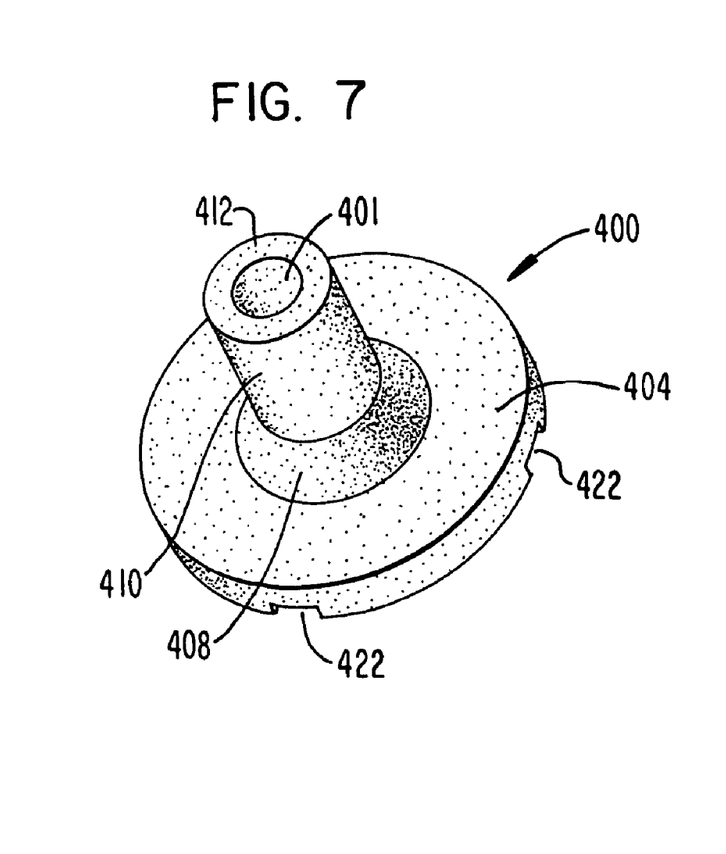
FIG. 7 is a top perspective view of a dome switch according to the invention.
Figure 8:
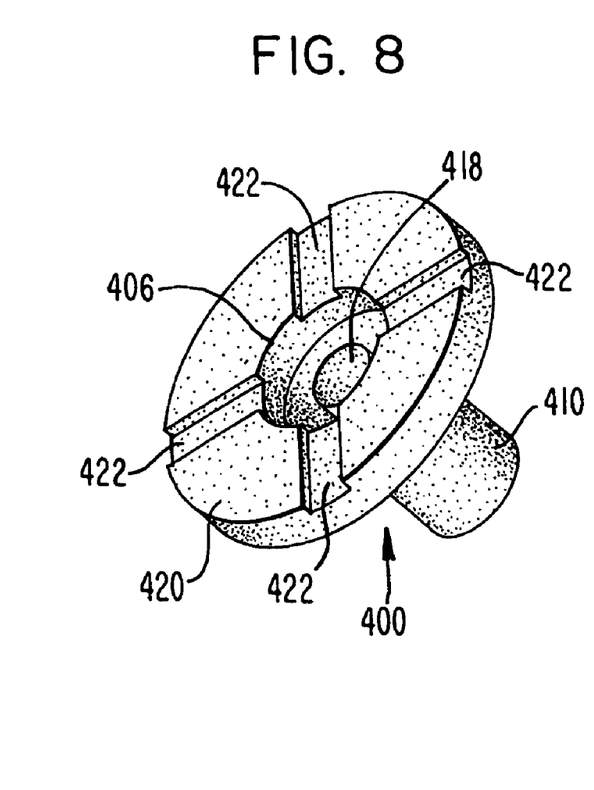
FIG. 8 is a bottom perspective view of a dome switch according to the invention.
Figure 9:
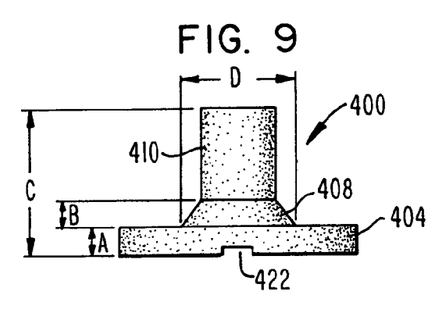
FIG. 9 is a side elevational view of a dome switch according to the invention.
Figure 10:
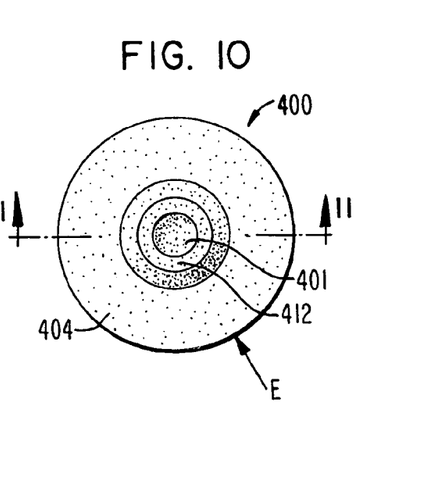
FIG. 10 is a top view of a dome switch according to the invention.
Figure 11:
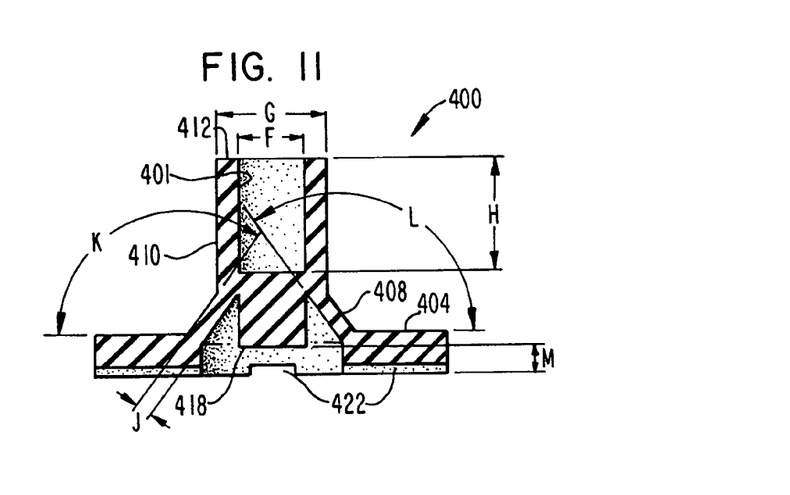
FIG. 11 is a cross section of a dome switch of the invention taken along line 11—11 of FIG. 10.

FIG. 7 shows a top perspective view of dome switch 400. FIG. 8 shows a bottom perspective view. In one embodiment, the bottom surface 420 of base 404 includes one or more vents 422. As midsection 408 is collapsed, the volume within hollow region 414 decreases and forces air out from within that region. Vents 422 allow that air to escape, thereby avoiding unwanted sideways deformation of switch 400, and also avoiding creation of a vacuum within the midsection that might prevent the midsection from returning to an uncollapsed condition. FIGS. 9 and 10 respectively show side and top views of switch 400; FIG. 11 is a cross section of switch 400 taken along section line 11—11 of FIG. 10. In one described embodiment, base 404 has a thickness A of 1 mm. In the described embodiment, midsection 408 may have a height B between 0.65 millimeters and 1.02 millimeters, more preferably between 0.75 millimeters and 1.02 millimeters, more preferably between 0.85 and 0.95 millimeters, and still more preferably of about 0.89 millimeters. The overall height C of switch 400 in this embodiment is 5 mm. Major outside diameter D of midsection 408 in this embodiment may be between 3.65 millimeters and 5.00 millimeters, preferably between 3.65 millimeters and 4.50 millimeters, more preferably between 3.65 millimeters and 4.00 millimeters, and still more preferably about 3.75 mm. An exemplary outside diameter E of base 404 is 8 mm. An exemplary inner diameter F for upper section 410 is 1.5 mm, and an exemplary outer diameter G is 2.50 mm. An exemplary depth H of depression 401 is 2.61 mm, and an exemplary height M of underside 418 above a circuit board or other substrate, prior to switch collapse, is less than 1.00 millimeters, preferably less than 0.80 millimeters, and still more preferably about 0.70 millimeters. Wall thickness J of midsection 408 in the described embodiment may be between 0.335 millimeters and 0.365 millimeters, preferably between 0.340 millimeters and 0.360 millimeters, more preferably between 0.345 millimeters and 0.355 millimeters, and still more preferably about 0.350 millimeters. Angles K (between the upper surface of base 404 and the outer surface of midsection 408) and L (between the upper surface of base 404 and the inner surface of midsection 408) in this embodiment are 125° and 125°, respectively, but may vary between 125 and 145 degrees. In one embodiment, switch 400 is fabricated from 50 durometer (Shore A scale) silicone elastomer. These dimensions are exemplary, and other dimensions for a dome switch are within the scope of the invention.

Figure 12:
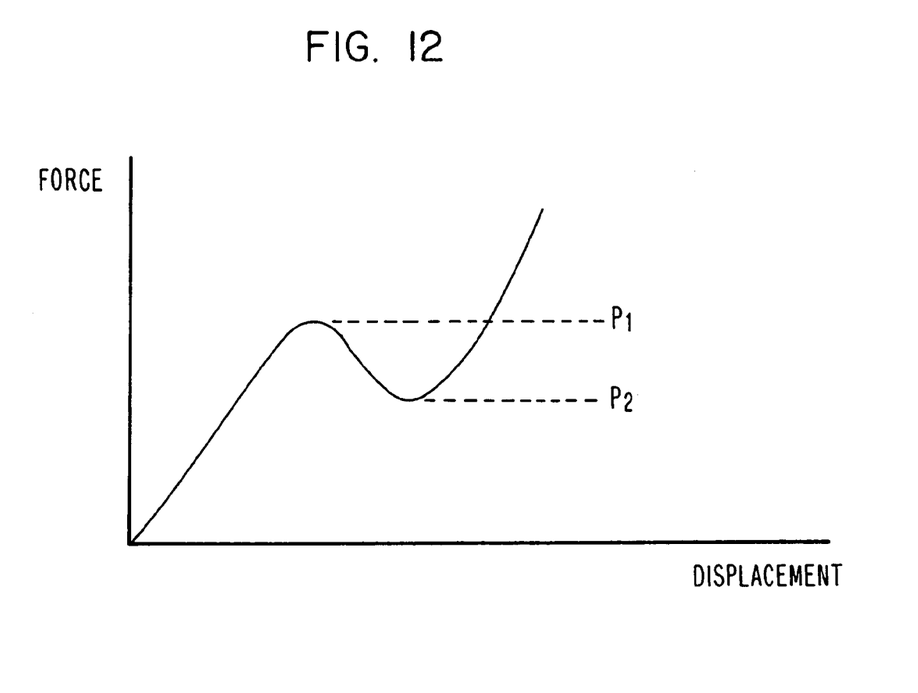
FIG. 12 is an exemplary force-displacement curve.

A common measure of switch performance is "snap ratio." Typically, the required force to close a switch increases with switch displacement. At a certain displacement, the force decreases, and then begins to increase for further displacement. FIG. 12 shows an exemplary force-displacement curve. Snap ratio is defined as $(P_1-P_2)/P_1$. An elastomeric dome switch according to the invention has a snap ratio of at least 35%, more preferably of at least 42%, and even more preferably of at least 47% or more; and an actuation force between 40–75 grams. An exemplary contact bounce could be 10 milliseconds.

Because elastomeric dome switches such as switch 400 are essentially silent, a mouse having switch 400 can be further modified, if desired, to provide a "click" or other sound when a mouse button is pressed. One or more additional plastic tabs or other protrusions could be added to mouse buttons 201 so as to mechanically generate a clicking sound. Other mechanical noise generation techniques are possible. A mouse could also be modified to electronically generate a noise when a mouse button is pressed. Such a sound could be generated by software operating on the computer to which the mouse is connected, and produced by a speaker attached to that computer. Alternatively, appropriate sound-generating firmware could be incorporated into circuitry within the mouse, and a piezoelectric speaker, other small speaker or other noise producing device placed within the mouse.

Figure 13:
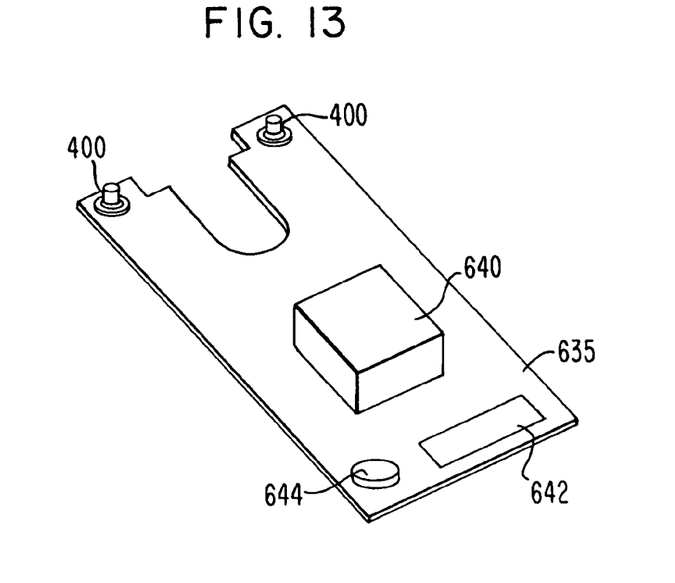
FIG. 13 is a perspective schematic diagram showing possible component locations in an alternate embodiment of the invention.

FIG. 13 is a perspective schematic drawing of an alternate embodiment of the invention incorporating an exemplary noise generator. FIG. 13 only shows a possible arrangement of components on circuit board 635, and does not purport to show all required electrical connections or other components that would be required for a functional mouse. The inclusion of such other components and interconnection thereof are within the abilities of a person skilled in the art, once that person is provided with the disclosures herein. In this alternative embodiment, circuit board 635 could be installed within a mouse housing in a manner similar to that shown in FIGS. 2 and 4. Located on circuit board 635 are two elastomeric dome switches 400 according to the invention. Additional switches 400 could be included. Although FIG. 13 shows switches 400 attached to circuit board 635, such need not be the case. As set forth above, one or more switches 400 could be attached to a post or other connection to a mouse button, with the switch 400 not affixed to circuit board 635. Also located on, or nested within, circuit board 635 are motion sensing components 640, as described previously, as well as a controller 642. Controller 642 could be a microprocessor, an Application Specific Integrated Circuit (ASIC), or other electronic processor or hardware platform configured, e.g., to communicate signals to a computer indicating mouse movement, button actuation, etc. Also located on circuit board 635 is piezoelectric speaker 644. Speaker 644 could be of many types commonly available (e.g., from Murata Electronics North America, Inc. of Smyrna, Ga.). As the mouse is moved across a surface, motion sensing components 640 detect that motion and provide appropriate signals to controller 642, which in turn provides signals to a computer or other device regarding the motion of mouse 600. Similarly, actuation of one of the switches 400 may cause controller 642 to send an appropriate signal to the computer (or other device) that one of the mouse buttons has been actuated. Upon actuation of one of the switches 400, controller 642 can also simultaneously cause speaker 644 to emit a desired sound.

Although several examples of carrying out the invention have been described, those skilled in the art will appreciate that there are numerous variations and permutations of the above described devices that fall within the spirit and scope of the invention as set forth in the appended claims. As but one example, an elastomeric dome switch could also be incorporated into other hand-held computer pointing devices, such as trackballs, where such switches have not previously been used. These and other modifications are within the scope of the invention, which is only to be limited by the attached claims.

What is claimed is:

1. A computer mouse comprising:
    a housing sized and configured for manual movement by a user across a surface so as to permit a corresponding movement of a cursor on a computer display, the housing having
        a primary button positioned at a forward location on an upper surface of the housing and on one lateral side of the upper surface, the primary button being positioned for use as one of a conventional right-click or left click mouse button, and
        a secondary button positioned at a forward location on the upper surface and on the other lateral side of the upper surface, the secondary button being positioned for use as the other of a conventional right-click or left click mouse button;
    an internal substrate contained with the housing and upon which multiple mouse components are electrically interconnected, and having first and second electrical connections respectively corresponding to the primary and secondary buttons;
    a first elastomeric dome switch positioned between the primary button and the first electrical connection and having a concave portion and a contact portion located within the concave portion, the concave portion being biased to an uncollapsed condition,
        coupled to the primary button,
        configured to collapse upon imposition of a depressing force on the primary button,
        configured, upon collapse, to bring the contact portion into position to close the first electrical connection, and
        further configured, upon reduction of the depressing force, to return to the uncollapsed condition and open the first electrical connection; and
    a second elastomeric dome switch positioned between the secondary button and the second electrical connection and having a concave portion and a contact portion located within the concave portion, the concave portion being
        biased to an uncollapsed condition,
        coupled to the secondary button,
        configured to collapse upon imposition of a depressing force on the secondary button,
        configured, upon collapse, to bring the contact portion into position to close the second electrical connection, and
        further configured, upon reduction of the depressing force, to return to the uncollapsed condition and open the second electrical connection.

2. The mouse of claim 1, wherein at least one of the first and second elastomeric dome switches has a snap ratio of at least 35%.

3. The mouse of claim 1, wherein at least one of the first and second elastomeric dome switches has a snap ratio of at least 42%.

4. The mouse of claim 1, wherein at least one of the first and second elastomeric dome switches has a snap ratio of at least 47%.

5. The mouse of claim 1, wherein at least one of the first and second elastomeric dome switches:
    has a travel distance from the un collapsed condition to a fully collapsed condition of 1 mm or less, and
    collapses under a force between 40 grams and 75 grams.

6. The mouse of claim 5, wherein the travel distance is 0.8 millimeters or less.

7. The mouse of claim 5, wherein the travel distance is about 0.7 millimeters.

8. The computer mouse of claim 1, wherein at least one of the first and second elastomeric dome switches further comprises:
    a base having an aperture defined therein;
    a hollow elastomeric midsection forming the concave portion, the midsection having a lower end with a perimeter substantially coinciding with the aperture, an inner region, a wall thickness and an upper end; and
    an upper section joined to the upper end of the midsection, the upper section having a distal end attached to a mouse button connector, wherein
        the contact portion is located within the inner region and attached to the upper end of the midsection,
        the contact portion has a contact surface, and
        the contact surface, upon collapse of the midsection, moves through the aperture to close the electrical connection.

9. The computer mouse of claim 8, wherein:
    at least one of the first and second electrical connections comprises a pair of electrical conductors, each having an exposed region,
    the contact surface comprises an electrically conductive material, and
    the contact surface, upon collapse of the midsection, makes electrical contact with the exposed regions.

10. The computer mouse of claim 8, wherein:
    at least one of the first and second electrical connections comprises a membrane switch, and
    the contact surface, upon collapse of the midsection, closes the membrane switch.

11. The computer mouse of claim 8, wherein the base is affixed to the internal substrate.

12. The computer mouse of claim 8 wherein at least one of the first and second elastomeric dome switches comprises a Shore A scale 50 durometer silicone elastomer.

13. The computer mouse of claim 8 wherein the midsection is generally frustoconical in shape and has a wall thickness of between 0.335 millimeters and 0.365 millimeters.

14. The computer mouse of claim 8 wherein the midsection is generally frustoconical in shape and has a wall thickness of between 0.340 millimeters and 0.360 millimeters.

15. The computer mouse of claim 8 wherein the midsection is generally frustoconical in shape and has a wall thickness of between 0.345 millimeters and 0.355 millimeters.

16. The computer mouse of claim 8 wherein the midsection has a major outer diameter of between 3.65 and 5.00 millimeters.

17. The computer mouse of claim 8 wherein the midsection has a major outer diameter of between 3.65 and 4.50 millimeters.

18. The computer mouse of claim 8 wherein the midsection has a major outer diameter of between 3.65 and 4.00 millimeters.

19. The computer mouse of claim 8 wherein the midsection has a height of between 1.02 and 0.65 millimeters.

20. The computer mouse of claim 8 wherein the midsection has a height of between 1.02 and 0.75 millimeters.

21. The computer mouse of claim 8 wherein the midsection has a height of between 0.95 and 0.85 millimeters.

22. The computer mouse of claim 8 wherein the midsection is generally frustoconical in shape, has a wall thickness of 0.345 to 0.365 millimeters, and has outer walls forming an exterior angle with the base of between 125 and 145 degrees.

23. The computer mouse of claim 1, wherein the mouse further comprises noise generating circuitry and a speaker, and wherein the noise generating circuitry causes the speaker to emit an audible sound when the contact portion closes the electrical connection.

24. A computer mouse, comprising:
   first and second externally depressible buttons;
   an internal circuit board;
   first and second open electrical connections disposed on the circuit board;
   first and second elastomeric dome switches respectively affixed to the circuit board over the first and second open electrical connections, each elastomeric dome switch comprising:
      a planar silicone base portion having an aperture defined therein and having at least one vent disposed between an interface of the base portion and the circuit board,
      a hollow frustoconical silicone midsection disposed over the aperture, said midsection having a wall thickness between 0.340 and 0.360 millimeters, a height of between 1.00 and 0.80 millimeters, and a major outer diameter of between 3.65 and 3.85 millimeters,
      an upper portion attached to the midsection, the upper portion having a depression formed therein, and
      a contact member disposed within the midsection and positioned such that, upon collapse of the midsection, the contact member moves through the aperture and closes the open electrical connection;
   a first connecting member having an upper end attached to a lower surface of the first depressible button and a lower end disposed within the depression of the first elastomeric dome switch; and
   a second connecting member having an upper end attached to a lower surface of the second depressible button and a lower end disposed within the depression of the second elastomeric dome switch.

* * * * *